United States Patent [19]

Klein et al.

[11] 3,870,781

[45] Mar. 11, 1975

[54] AIR POLLUTION CONTROL SYSTEM

[75] Inventors: Herschel Alan Klein, Windsor; Carl Richard Bozzuto, Waterbury, both of Conn.

[73] Assignee: Combustion Engineering, Inc., Windsor, Conn.

[22] Filed: July 27, 1972

[21] Appl. No.: 275,662

[52] U.S. Cl............................. 423/242, 423/166
[51] Int. Cl............................................ C01b 17/00
[58] Field of Search .................... 423/242–244, 423/166, 555

[56] References Cited
UNITED STATES PATENTS
1,271,899  7/1918  Howard et al. ................. 423/242
2,161,056  6/1939  Johnstone et al. ............... 423/242

Primary Examiner—Oscar R. Vertiz
Assistant Examiner—Gregory A. Heller
Attorney, Agent, or Firm—Richard H. Berneike

[57] ABSTRACT

An air pollution control system for treating the flue gases from a fossil fuel fired furnace scrubs the gases with a solution of NaOH whereby $Na^+$ and $HSO_3^-$ are formed in solution. The $HSO_3^-$ is then oxidized to form $H^+$ and $SO_4^=$ ions. The solution is then causticized with CaO to form NaOH and precipitate $CaSO_4$. The precipitated $CaSO_4$ and the fly ash collected in the scrubber are then separated from the NaOH solution. The solution is then diluted with make-up water to form the NaOH scrubbing solution for recycle to the scrubber.

6 Claims, 3 Drawing Figures

AIR POLLUTION CONTROL SYSTEM

BACKGROUND OF THE INVENTION

The discharge of pollutants into the atmosphere has become of increasing concern as the rate of discharge increases and as the level of pollutants in the atmosphere increases. One of the sources of air pollution is the sulfur oxides and particulate matter which are discharged with the flue gases during the combustion of sulfur-containing fuels. A number of systems have been developed or proposed to remove the sulfur oxides and particulate matter from the flue gases. One of the first commercial systems involves scrubbing the flue gases with an aqueous solution which contains materials which will react with the sulfur oxides. The most commonly used materials are limestone and dolomite which may be added either to the furnace or directly to the scrubbing solution. However, unless specific measures are taken and very careful controls maintained on the system chemistry, precipitates form in the scrubber and the system piping which tend to plug up the system and may eventually force shut down.

SUMMARY OF THE INVENTION

The present invention relates to an air pollution control system and more specific to a system in which the gases containing sulfur oxides are scrubbed with an aqueous solution containing an alkali metal hydroxide whereby the sulfur oxides are reacted with the hydroxides to form bisulfites. The invention further involves the conversion of the bisulfites to sulfate and hydrogen ions and the reaction of the sulfate and hydrogen ions with alkaline earth metal compounds to precipitate alkaline earth metal sulfates and reform the alkali metal hydroxide scrubbing solution. Other features of the invention and the advantages will be apparent from the description which follows.

DETAILED DESCRIPTION OF THE PREFERRED EMBODIMENT

Figure 1:
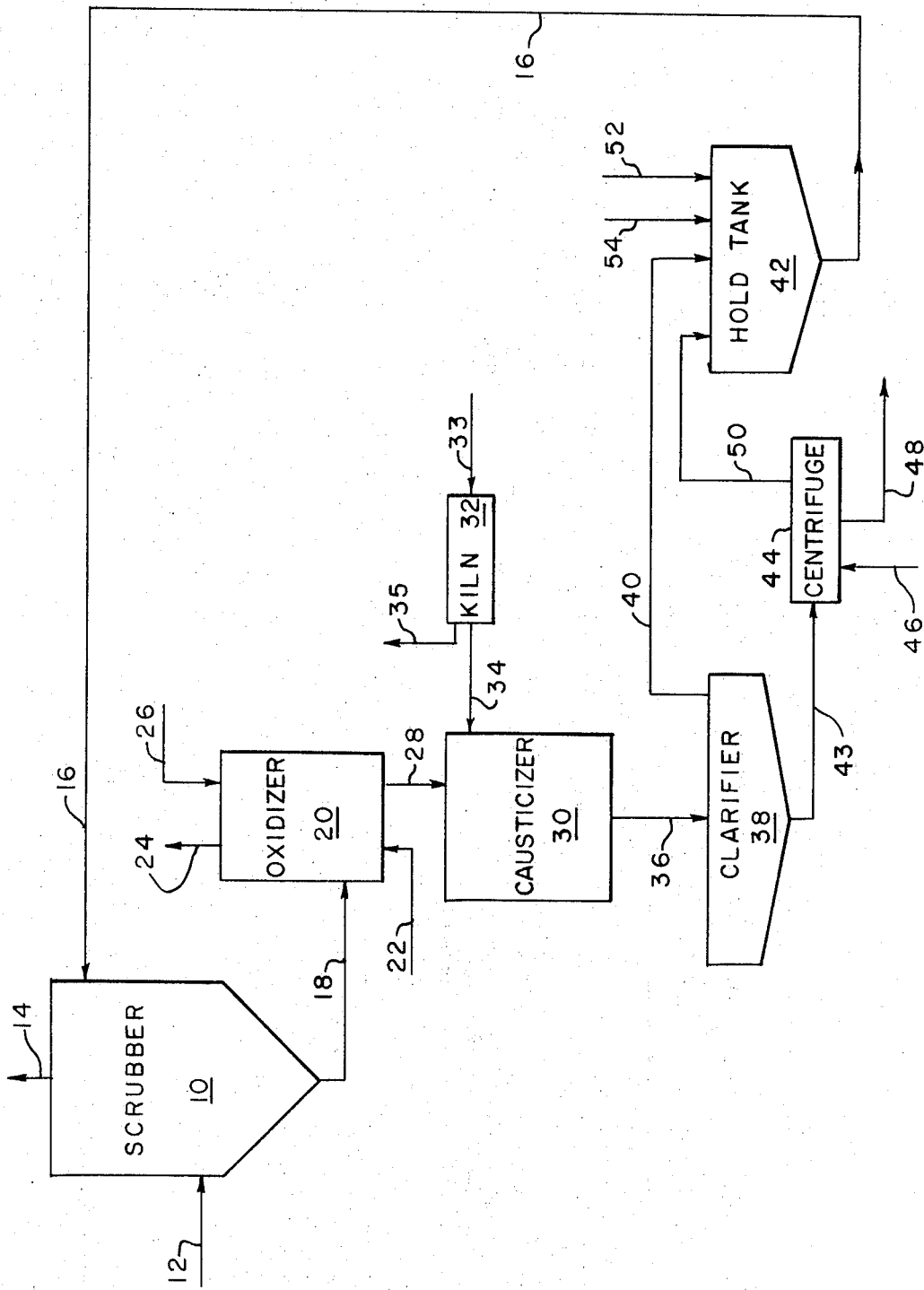
FIG. 1 is a flow diagram illustrating the present invention.

Referring first to FIG. 1, the flue gases containing sulfur oxides and fly ash enter the scrubber 10 through the duct 12 and the cleaned gases exit through duct 14. The scrubber may be of the marble bed type or any other suitable scrubber for liquid-gas contact and fly ash removal. The scrubbing solution, which contains NaOH and CaSO$_4$, enters the scrubber from line 16 and is contacted with the flue gas. The scrubbing solution recirculation rate is set or adjusted such that sufficient NaOH will always be present to remove all of the sulfur oxides by the following reaction:

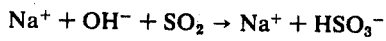

This is accomplished by providing an excess of NaOH above that required to react with the SO$_2$ in the flue gas. If only the stoichiometric amount of NaOH were provided, the resulting pH of the scrubber solution would be about 4.5. Sufficient excess NaOH is provided such that the resulting pH will be in the range of about 5.0 to 5.6. If larger quantities of NaOH were used and the pH were higher, there would be a tendency to form sulfites instead of bisulfites which could result in precipitation and scaling. Also, in the pH range of 5.0 to 5.6, there will be little CO$_2$ absorbed from the flue gas.

The spent scrubbing solution containing NaHSO$_3$, CaSO$_4$ and residual NaOH in solution as well as fly ash leaves the scrubber through line 18 and is introduced into the oxidizer 20. In the oxidizer the spent scrubbing solution is contacted with air from line 22 in a counter-current fashion whereby the bisulfite in the solution is oxidized to sulfuric acid and Na$_2$SO$_4$ by the following reaction:

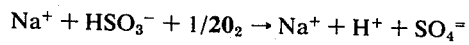

The formation of hydrogen ions causes the pH to drop to about 2.0 and any residual CO$_2$ is driven off and exists the oxidizer through line 24 along with the excess air. Make-up water and make-up sodium sulfate to replace the water and sodium lost with the discharged solids are also added to the oxidizer 20 through line 26. The solution which is now acidic leaves the oxidizer through line 28 where it enters the causticizer 30.

Limestone is introduced into the kiln 32 from line 33. The CaCO$_3$ is converted to CaO in the kiln which is then introduced into the causticizer 30 via line 34 where it is converted to the hydroxide. The flue gas from the kiln may be discharged to the economizer of the boiler by line 35 for heat recovery. The following reaction takes place in the causticizer:

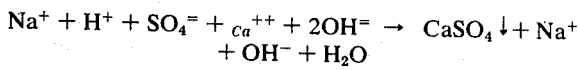

It can be seen that this reaction causes the precipitation of the CaSO$_4$ and regenerates an NaOH solution.

The slurry leaves the causticizer 30 through line 36 and enters the clarifier 38 in which the CaSO$_4$ and fly ash solids are concentrated. The supernatant solution is removed from the clarifier 38 through line 40 and is sent to the hold tank 42. The concentrated solids from the clarifier 38 are sent through line 43 to the centrifuge 44 or some other filtering device. Some make-up water is introduced into the centrifuge 44 through line 46 as wash water to recover NaOH from the solids. The solids from the centrifuge are discharged through line 48. These solids which contain primarily CaSO$_4$, fly ash and water together with a small amount of residual NaOH solution may be disposed of in any desired manner. The wash water from the centrifuge 44, which now contains some NaOH, is sent to the hold tank 42 through line 50.

The remainder of the make-up water which is necessary to compensate for the water discharged with the saturated flue gas is added to the hold tank 42 through line 52 so as to regenerate the dilute scrubbing solution. The scrubbing solution is then returned to the scrubber 10 through line 16 to complete the cycle. NaOH which is lost from the cycle with the solids is also added as required to the hold tank 42 through line 54.

Figure 2:
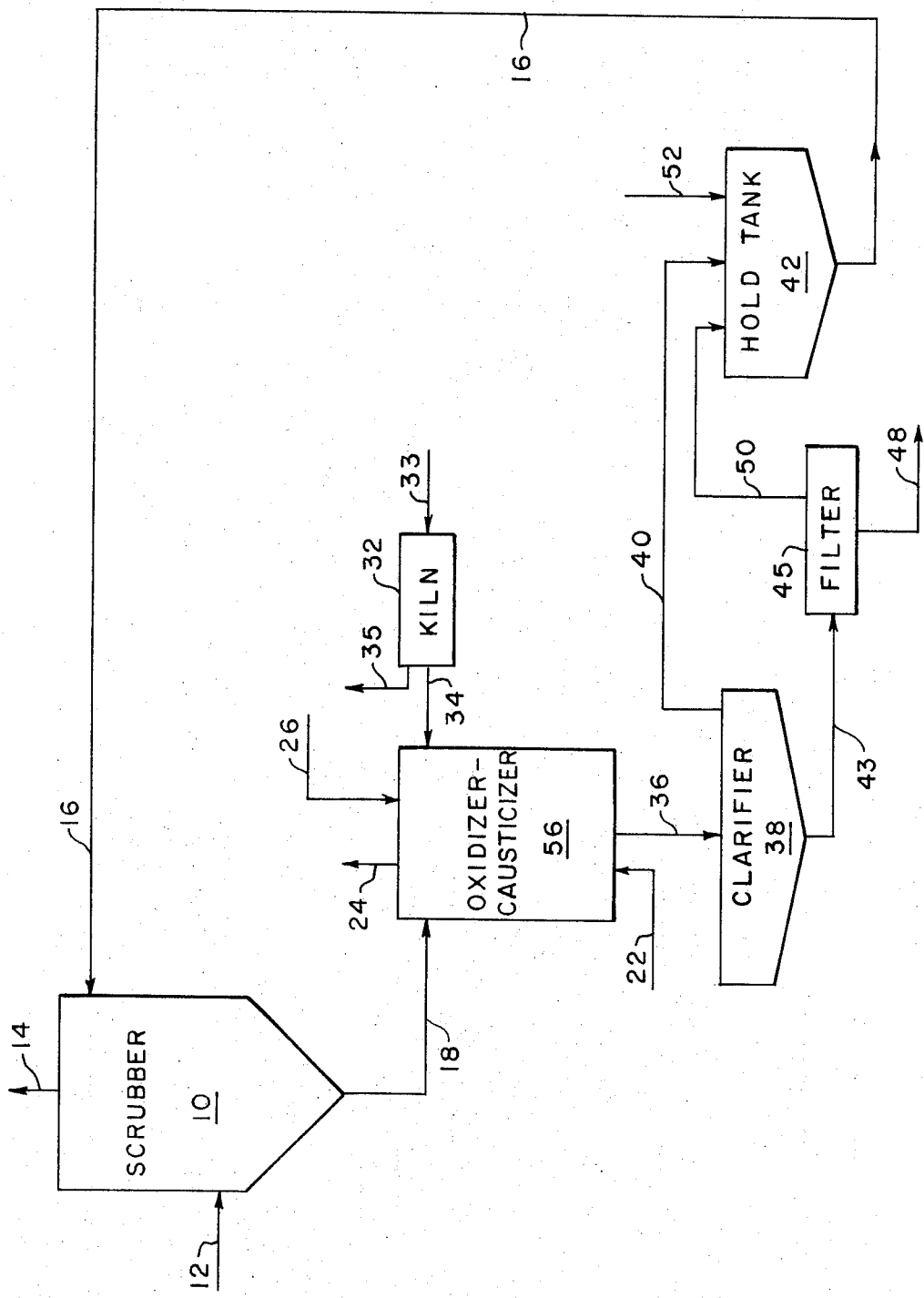
FIGS. 2 and 3 are flow diagrams which illustrate modifications of the present invention.

FIG. 2 illustrates a modification of the present invention in which the oxidizing and causticizing steps are combined in one unit 56. Following is a table which illustrates a typical material balance for the present invention as applied to the FIG. 2 embodiment. The numbers at the head of each column correspond to the numbers in FIG. 2 and the figures in each column represent the weight in pounds per minute of each component flowing in the various lines.

| | 3 | | | | | | 4 | | | | | |
|---|---|---|---|---|---|---|---|---|---|---|---|---|
| | 12 | 14 | 16 | 18 | 26 | 33 | 34 | 36 | 40 | 42 | 48 | 50 | 52 |
| Flue gas | 28,500 | 28,500 | | | | | | | | | | | |
| SO$_2$ | 120 | | | | | | | | | | | | |
| Ash | 200 | | | | | | | | | | | | |
| H$_2$O | | 900 | 57,000 | 56,100 | 472 | | | 56,572 | 55,156 | 1,416 | 472 | 944 | 900 |
| NaOH | | | 80 | 5 | | | | 81 | 78 | 3 | 1 | 2 | |
| CaSO$_4$ Solid | | | | | | | | 272 | | 272 | 272 | | |
| CaSO$_4$ Soln. | | | 160 | 160 | | | | 162 | 156 | 6 | 2 | 4 | |
| NaHSO$_3$ | | | | 195 | | | | | | | | | |
| CaCO$_3$ | | | | | | 200 | | | | | | | |
| CaO | | | | | | | 112 | | | | | | |
| Na$_2$SO$_4$ | | | | | 2 | | | | | | | | |

Figure 3:
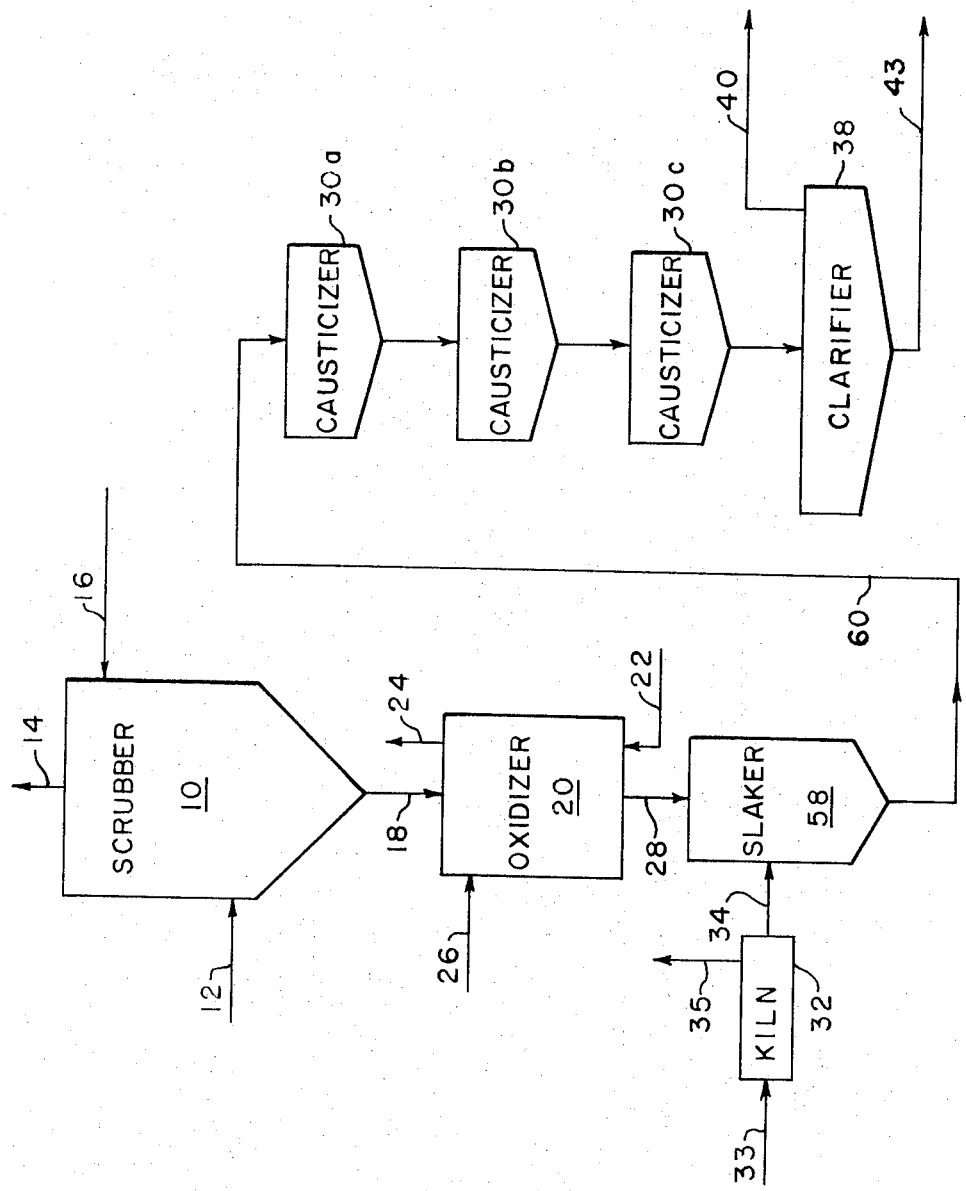

FIG. 3 illustrates a further embodiment of the invention in which a slaker 58 is included so that there will be a more complete utilization of the CaO from the kiln 32. Also, a series of causticizers 30A, 30B and 30C are employed so as to assure the complete conversion to NaOH.

The present invention eliminates all sulfites from the system since these would be a source of chemical oxygen demand and thus objectionable from a water pollution standpoint. Also, the elimination of soluble sulfites prevents any possibility of SO$_2$ back pressure in the system which would reduce the effect of the system in reducing SO$_2$ from the flue gas. A further result of the elimination of the sulfite ions is that scaling and plugging problems are avoided. The air oxidation of the scrubber effluent eliminates CO$_2$ from the system thus preventing loss of alkali due to CaCO$_3$ precipitation.

While preferred embodiments of the present invention and specific examples have been described, it will be understood that changes may be made without departing from the spirit and scope of the invention as claimed.

What is claimed is:

1. A method of removing SO$_2$ from a flue gas stream comprising the steps of:
   a. contacting said flue gas with an aqueous scrubbing solution containing NaOH and CaSO$_4$ whereby a portion of said NaOH reacts with said SO$_2$ to form sodium ions and bisulfite ions, said NaOH being present in an amount greater than that required to react with said SO$_2$ whereby excess NaOH will always be present and wherein the pH is maintained in the range of 5.0 to 5.6;
   b. contacting said aqueous scrubbing solution from step (a) with oxygen whereby said bisulfite ions are oxidized to form hydrogen ions and sulfate ions in solution;
   c. contacting said aqueous scrubbing solution from step (b) with CaO whereby CaSO$_4$ is precipitated and NaOH is formed in solution;
   d. separating precipitated CaSO$_4$ from said aqueous scrubbing solution; and
   e. recycling said aqueous scrubbing solution to step (a).

2. A method as recited in claim 1 and further including the step of adding make-up water and Na$_2$SO$_4$ to said aqueous scrubbing solution subsequent to step (a) and prior to step (c).

3. A method as recited in claim 1 and further including the step of washing said separated precipitated CaSO$_4$ with water and returning said washing water to step (a).

4. A method as recited in claim 3 and further including the step of adding additional make-up water to said recycled aqueous scrubbing solution.

5. A method as recited in claim 1 wherein the pH following step (b) is about 2.0.

6. A method as recited in claim 1 and further including the step of adding NaOH make-up to said recycled aqueous scrubbing solution prior to step (a).

* * * * *